Lawton & Bliss,
Hose Coupling,
Nº 23,033. Patented Feb. 22, 1859.
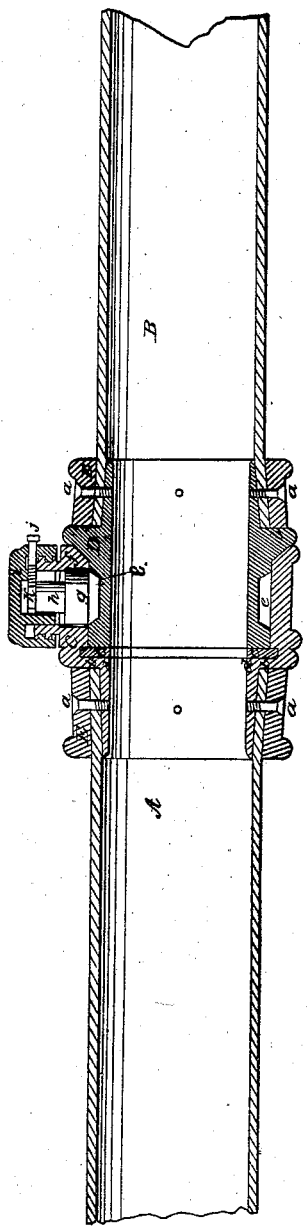
Witnesses:
John W. Vose
James B. Brown
Inventor:
R. B. Lawton
W. H. C. Bliss

UNITED STATES PATENT OFFICE.

ROBERT B. LAWTON AND WM. H. BLISS, OF NEWPORT, RHODE ISLAND.

HOSE-COUPLING.

Specification forming part of Letters Patent No. 23,033, dated February 22, 1859; Reissued December 21, 1869, No. 3,768.

*To all whom it may concern:*

Be it known that we, ROBERT B. LAWTON and W. H. BLISS, both of Newport, in the county of Newport and State of Rhode Island, have invented a new and Improved Hose-Coupling; and we do hereby declare that the following is a full, clear, and exact description of the same, reference being had to the annexed drawing, making a part of this specification, said drawing being a longitudinal central section of our invention.

The object of this invention is to connect hose together in such a manner that a swivel joint will be attained and at the same time certain provision made for compensating for the wear attending such connection so that the coupling may always be kept water tight by the mere act of adjusting or connecting the parts together.

The invention consists in having a metal thimble or tube attached to each end of the hose to be connected, one thimble fitting within the other and the inner one grooved circumferentially to receive one or more taper or conical rollers that are adjusted by screw caps so as to secure the two thimbles together and also keep the end of the innermost one against a packing or ground seat at the inner side of the outermost one, whereby the desired object is attained as hereinafter described.

To enable those skilled in the art to fully understand and construct our invention we will proceed to describe it.

A, B, represent the ends of two pieces of hose.

C, is a metal thimble or tube which is attached to the end of hose A, and D, is a thimble or tube which is attached to the end of hose B. These thimbles may be cast of any suitable metal and may be secured to the hose by metal bands E, E, which encompass the hose and through which and the bands and the inner ends of the thimbles screws $a$, pass, the ends of the hose being between the bands E, E, and the inner ends of the thimbles as shown clearly in the drawing.

It will be seen by referring to the drawing that the ends of the hose A, B, and bands E, E, abut against shoulders $b$, on the thimbles.

The thimble D, its outer portion beyond its hose B, is smaller than the corresponding portion of the thimble C, so much so that D, may fit within C, and the end of D, abut against a packing or ground seat $c$, placed on a shoulder $d$, which is formed within C, by its enlargement, it being understood that the inner ends of the thimbles within the hose are equal in diameter.

The thimble D, is grooved circumferentially as shown at $e$, the sides of the groove being beveled or inclined, so that the outer part is wider than the inner part, and on the thimble C, tubular flanches $f$, are cast, one or more, the openings or interior of the flanches passing through the thimble C, and having conical metal rollers $g$, placed within them, said rollers being provided with stems $h$, which pass into caps $i$, and are secured therein by pins or small screws $f$, which pass laterally into grooves in the stems as shown at $k$. The roller stems $h$, are allowed to turn freely within the caps $i$, and the caps $i$, screw on the flanches $f$, as plainly shown in the drawing.

From the above description it will be seen that by fitting the thimble D, within C, and screwing down the rollers $g$, into the groove $e$, in thimble D, that the ends A, B, of the hose will be connected and a swivel joint obtained, that is to say, the hose A, B, may be turned or rotated and consequently prevented from being twisted in handling. The roller or rollers $g$, rotate in the groove $e$, and thereby prevent friction and favor the easy turning or rotation of the hose. It will also be seen that as the roller or rollers $g$, are screwed down into the recess $e$, said roller or rollers will by their conical form and in consequence of bearing against the outermost beveled edge of recess $e$, provision being made for such result, force the outer end of thimble D, against the packing or seat $c$, and thereby form a water tight joint, and as the roller or rollers $g$, may be screwed down more or less as occasion may require, the wear attending the turning of the coupling may be compensated for and a water tight joint always obtained.

We do not claim connecting the two parts or thimbles C, D, together by means of a screw or pin passing through one thimble and fitting in a groove in the other, for such coupling or connection is well known and has been used if not for the same, for analogous purposes; but,

Having thus described our invention, what we do claim as new and desire to secure by Letters Patent, is,

The two thimbles C, D, attached to the ends of the hose A, B, the thimble C, being provided with the shoulder $b$, and ground seat or packing $c$, and the thimble D, provided with the groove $e$, with inclined sides and fitted within thimble C, the above parts being used in connection with the conical roller or rollers $g$, fitted in the screw caps $i$, and the whole arranged to operate as and for the purpose set forth.

ROBT. B. LAWTON.
W. H. BLISS.

Witnesses:
JOHN W. VOSE,
JAMES B. BROWN.

[FIRST PRINTED 1910.]